Oct. 9, 1962  J. M. BAILEY  3,057,334
PISTON HEAD WITH FUEL DIRECTING MEANS
Filed Jan. 12, 1961
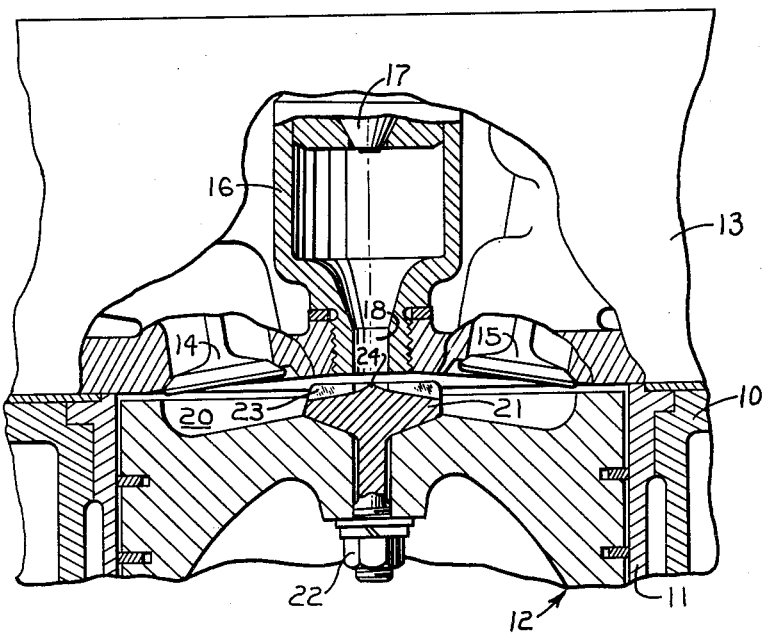
Fig_1_
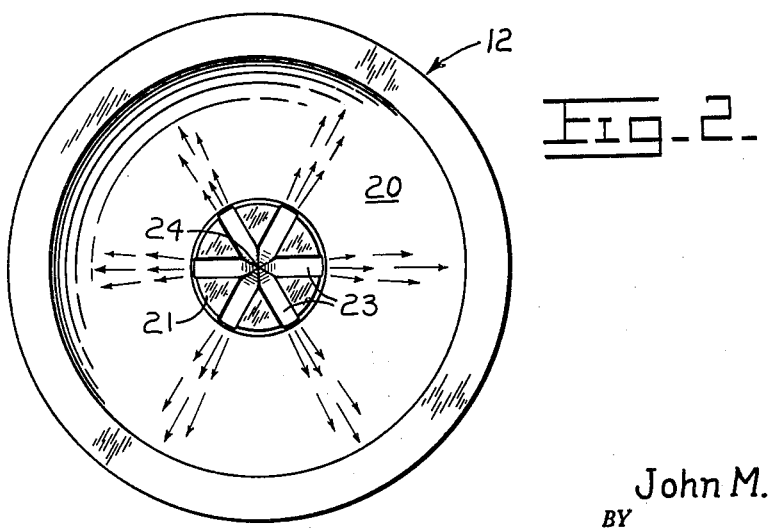
Fig_2_
INVENTOR.
John M. Bailey
BY
*Fryer and Zimwald*
ATTORNEYS

United States Patent Office 3,057,334
Patented Oct. 9, 1962

3,057,334
PISTON HEAD WITH FUEL DIRECTING MEANS
John M. Bailey, East Peoria, Ill., assignor to Caterpillar Tractor Co., Peoria, Ill., a corporation of California
Filed Jan. 12, 1961, Ser. No. 82,313
5 Claims. (Cl. 123—32)

This invention relates to piston heads for internal combustion engines of the compression ignition type and of the kind wherein fuel enters the cylinder through a precombustion chamber and pertains particularly to means for insuring good fuel air mixture in the main combustion chamber.

It is well recognized that satisfactory or complete combustion of fuel in an engine depends in a large part upon good admixture of fuel and air during the phenomenon of combustion and many attempts have been made to improve their mixture. It is recognized that mixture can be improved by directing the fuel radially outwardly within the main combustion chamber in a plurality of jets or streams which tend to penetrate the air or gas in the chamber and create turbulence which contributes to good mixture. Attempts have been made to create this effect by the use of multi-orifice tips on the precombustion chamber. A multi-orifice tip is in effect a cap which closes the delivery end of the precombustion chamber and has small perforations spaced throughout its periphery to admit jets of fuel into the main chamber.

Difficulties are encountered with multi-orifice tips because they are inherently weak and subject to breakage in operation with resulting damage to the piston or cylinder walls. Furthermore the small orifices do not readily admit air into the precombustion chamber on the compression stroke of the piston and initial combustion of fuel within the precombustion chamber is adversely affected.

It is the object of the present invention to provide a structure which produces good combustion of fuel in an engine without the above mentioned disadvantages.

Another object of the invention is to provide a piston head with a nozzle configuration so disposed with respect to a single orifice precombustion chamber that fuel is induced to flow in radially directed penetrating jets within the main chamber.

Further and more specific objects and advantages of the invention are made apparent in the following specification wherein reference is made to the accompanying drawing for a more detailed description of the invention.

In the drawing:

FIG. 1 is a central vertical section through one cylinder and piston of an internal combustion engine showing the upper portion only of a piston embodying the present invention and a portion of the head block of the engine including the precombustion chamber therein through which fuel is delivered to the cylinder; and FIG. 2 is a plan view of the head end of the piston shown in FIG. 1.

A portion of an engine cylinder block is shown at 10 in FIG. 1 as having a cylinder liner 11 in which a piston generally indicated at 12 is shown at its top dead center position. A part of the engine head block is illustrated at 13 as containing the usual intake and exhaust valves 14 and 15 and a centrally disposed precombustion chamber 16 of conventional design into which fuel is injected under pressure and at properly timed intervals through an injection nozzle, the end of which is shown at 17. The fuel is ignited under the heat of compression resulting from the compression stroke of the piston and, upon burning and expanding, issues through the throat 18 of the precombustion chamber into the main combustion chamber of the cylinder where it continues to burn and expand forcing the piston through the power stroke of its cycle. It is to the complete burning and consequent utmost expansion of the gas within the main combustion chamber that the present invention is directed.

The piston illustrated is generally of the conventional type having a shallow annular crater 20 in its head which rises centrally to a high portion disposed coaxially with respect to the throat of the precombustion chamber. In the present case, the piston is shown as having a heat plug 21 disposed in this central position which is simply a member of durable heat resisting material such as steel upon which the burning fuel from the precombustion chamber impinges to protect the lighter less durable aluminum or alloy of which the main body of the piston is made. This plug is conventionally secured in place as by a nut 22 on a threaded stem which extends through a suitable opening in the head of the piston.

In accordance with the present invention, the centrally disposed high portion of the piston crater or in this case the top of the heat plug 21 is provided with a plurality, herein shown as 6, radially extending grooves 23. These grooves converge to form a central apex 24 which is coaxial with the throat of the precombustion chamber. As a consequence of this configuration of the central portion of the piston head or heat plug, as the case may be, the jet of burning fuel emitting from the throat of the precombustion chamber is divided or channeled by the grooves 23 to form a plurality of jets directed radially outwardly of the crater 20 in the manner and in the direction indicated by arrows in FIG. 2 cutting through and causing turbulence of the air within the main combustion chamber and inducing thorough mixture of unburned fuel with the oxygen required for its combustion. The number, size and precise configuration of the grooves 23 may be varied depending upon the design of the piston and combustion space of the engine. It is desirable, however, that these grooves merge to the centrally disposed apex 24 in alignment with the throat of the precombustion chamber, the apex being formed as by cutting the grooves with a small cylindrical mill so that each groove may be terminated in an upwardly directed arc as shown in FIG. 1. It is also desirable that the grooves be of substantial depth and that they have well defined side walls preferably at right angles to their bottom surfaces to provide distinct channels as distinguished from a wavy or undulating surface so that they are capable of confining the burning gases in a jet-like pattern rather than simply spreading them over the head of the piston. This jet effect contributes to the turbulence and complete mixture of the fuel and oxygen.

One advantage of the present invention over the use of a multi-orifice tip on the precombustion chamber is that the jetting of the fuel takes place at or closely adjacent to the piston head as it recedes during the power stroke whereas the multi-orifice tip produces jets adjacent the end of the cylinder so that the air adjacent the cylinder head as it recedes may remain relatively undisturbed. Another advantage is that the full open throat of the precombustion chamber is retained for the admission of air during the compression stroke of the piston to support initial combustion adjacent the nozzle 17. Furthermore the invention provides a very simple inexpensive means for creating complete combustion which is readily adaptable to engines of different design and includes no parts which are fragile nor likely to require adjustment or repair.

I claim:
1. In combination with an engine piston reciprocable within a cylinder which has a precombustion chamber arranged to deliver burning fuel through the head of the cylinder, a raised portion in the piston head in alignment with the path of entry of the fuel and a plurality of radially extending grooves having greater width than depth in said raised portion to channel the incoming fuel into radially directed streams, said grooves having a common central terminus and upwardly curved inner ends providing an apex at said terminus.

2. In combination with an engine piston reciprocable within a cylinder which has a precombustion chamber arranged to deliver a burning combustible mixture through a restricting orifice in the head of the cylinder, a raised portion in the piston head in alignment with the path of discharge from the precombustion chamber and a plurality of radially extending shallow grooves in said raised portion to distribute the incoming mixture into the main combustion chamber.

3. In combination with an engine piston reciprocable within a cylinder which has a precombustion chamber arranged to discharge a burning combustible mixture through an orifice in the head of the cylinder, a raised portion in the piston head in alignment with the path of discharge and a plurality of grooves in said raised portion to spread the incoming mixture over the piston head, said grooves having a common terminus in alignment with said path of entry.

4. In a compression ignition engine characterized by having cratered piston heads and precombustion chambers having throats for directing a burning combustible mixture into the main combustion spaces and toward said craters, the improvement which comprises a raised portion in each crater forming an apex in alignment with the discharge issuing from said throat and having grooves starting at and directed outwardly from said apex to channel the discharge in jets throughout the crater.

5. In a compression ignition engine characterized by having cratered piston heads and precombustion chambers having throats for directing a burning combustible mixture into the main combustion spaces and toward said craters and in which a heat plug is disposed in each crater generally centrally thereof and forming an apex in line with the path of the mixture from the precombustion chamber, the improvement which comprises a plurality of grooves extending from a common central position on the heat plug radially outwardly through its outer edge to induce channeled outward flow of fuel over the head of the piston.

References Cited in the file of this patent

UNITED STATES PATENTS

| 2,256,776 | Kammer | Sept. 23, 1941 |

FOREIGN PATENTS

| 673,149 | France | Sept. 30, 1929 |
| 486,963 | Germany | Nov. 28, 1929 |
| 521,072 | Germany | Nov. 10, 1931 |
| 516,370 | Belgium | Jan. 15, 1953 |